H. H. TIETJENS.
Hand Plow.

No. 68,469

Patented Sept. 3, 1867.

Witnesses:

Inventor:

Hans H. Tietjens

United States Patent Office.

HANS H. TIETJENS, OF LYONS, IOWA.

Letters Patent No. 68,469, dated September 3, 1867.

---

IMPROVEMENT IN CULTIVATOR.

---

The Schedule referred to in these Letters Patent and making part of the same.

---

TO ALL WHOM IT MAY CONCERN:

Be it known that I, HANS H. TIETJENS, of Lyons, in the county of Clinton, and State of Iowa, have invented a new and useful Implement for Accomplishing the Cultivation of the Soil by Hand in a neater and more accurate manner than can be obtained by the use of the ordinary horse-plough; and I do hereby declare that the following is a full, clear, and exact description thereof, reference being had to the accompanying drawings, and the letters of reference marked thereon.

The nature of my invention consists in providing a convenient implement for securing the satisfactory preparation of the soil for hedges, gardens, nurseries, and such other purposes in which it is desirable to turn a furrow with great neatness and accuracy, and also necessary to avoid the trampling of horses on the young trees, hedges, flowers, &c.

To enable others to make and use my invention, I will proceed to describe its construction and operation.

Figure 1:
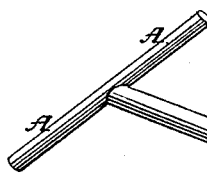

Figure 1 of the annexed drawings is an isometrical drawing of the device.

Figure 2:
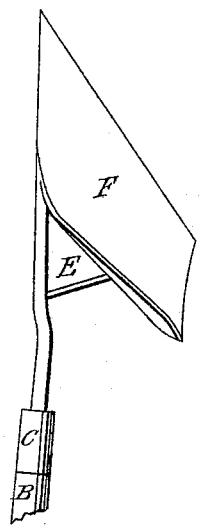

Figure 2, a top view.

Figure 3:
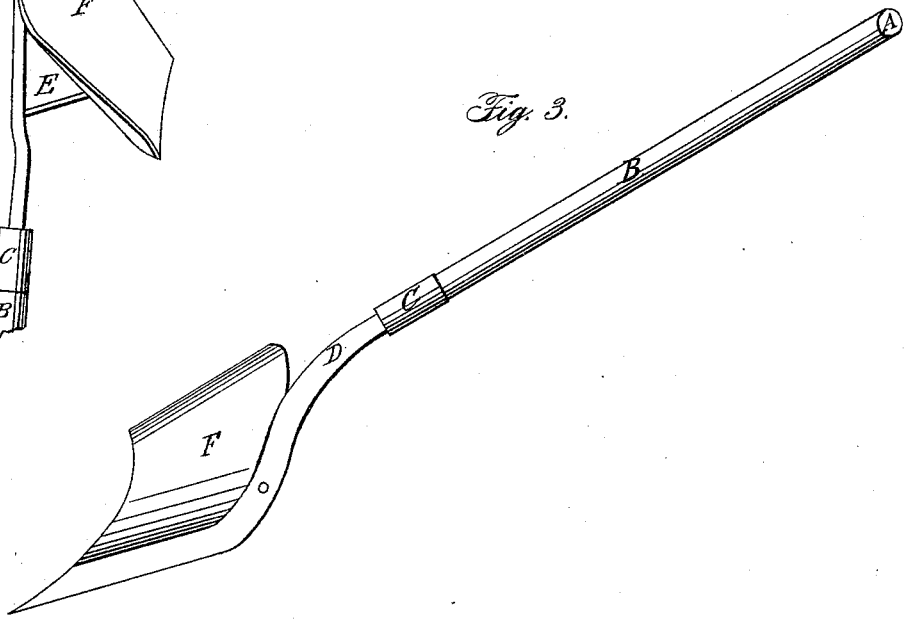

Figure 3, a side elevation.

A, figs. 1 and 3, represents the cross-bar; B, figs. 1, 2, and 3, represents the handle; C, figs. 1, 2, and 3, the ferrule for firmly securing the beam D; D, figs. 1, 2, and 3, represents the beam of the plough; E, figs. 1 and 2, a brace; F, figs. 1, 2, and 3, the mould-board and ploughshare, here represented in one piece. I construct the mould-board and ploughshare F of iron, or any suitable material, and in either one or more pieces. I attach to it the beam D, with its brace E, said beam being placed at such an angle with the share F as shown in fig. 3, or as may be most convenient for use. I construct the cross-bar A and handle B of wood, or other suitable material, and insert in it the end of the beam D, firmly securing it with the ferrule C. It will be readily seen that by pushing on the cross-bar A the share F will be drawn into the ground, turning a furrow, as desired.

What I claim as my invention, and desire to secure by Letters Patent, is—

A hand-plough, when constructed and operating substantially as described.

HANS H. TIETJENS.

Witnesses:
    JNO. W. McLEOD,
    B. H. A. HENNINGSEN.